United States Patent [19]

Santiago et al.

[11] 4,344,922

[45] Aug. 17, 1982

[54] CATALYZER FOR DETOXIFYING EXHAUST GASES FROM INTERNAL COMBUSTION

[75] Inventors: Andres Santiago; Enrique Santiago, both of Augsburg, Fed. Rep. of Germany

[73] Assignee: Zeuna-Staerker KG, Augsburg, Fed. Rep. of Germany

[21] Appl. No.: 831,045

[22] Filed: Sep. 6, 1977

Related U.S. Application Data

[62] Division of Ser. No. 342,540, Mar. 19, 1973.

[30] Foreign Application Priority Data

| | | | |
|---|---|---|---|
| Mar. 21, 1972 | [DE] | Fed. Rep. of Germany | 2213539 |
| Apr. 28, 1972 | [DE] | Fed. Rep. of Germany | 2220921 |
| May 9, 1972 | [DE] | Fed. Rep. of Germany | 2222663 |
| Jan. 26, 1973 | [DE] | Fed. Rep. of Germany | 2302789 |

[51] Int. Cl.³ ........ F01N 3/15; B01J 8/06

[52] U.S. Cl. ........ 422/179; 422/180

[58] Field of Search ........ 422/174, 180; 285/55; 138/112, 114

[56] References Cited

U.S. PATENT DOCUMENTS

| | | | |
|---|---|---|---|
| 3,251,612 | 5/1966 | Webbe | 205/55 X |
| 3,441,381 | 4/1969 | Keith et al. | 422/179 X |
| 3,441,382 | 4/1969 | Keith et al. | 422/180 |
| 3,597,165 | 8/1971 | Keith et al. | 422/180 |
| 3,692,497 | 9/1972 | Keith et al. | 422/179 |
| 3,771,967 | 11/1973 | Nowak | 422/179 |
| 3,798,006 | 3/1974 | Balluff | 422/179 |

*Primary Examiner*—Barry S. Richman
*Attorney, Agent, or Firm*—Brumbaugh, Graves, Donohue & Raymond

[57] ABSTRACT

A monolithic catalyst body of brittle material is supported in a housing by elastically yielding supporting means which in turn are held in position by holding means in such a manner that the elastically yielding supporting means, such as rings, layers, or packings, yieldingly restrain the catalyst body against movement in a radial direction as well as in an axial longitudinal direction whereby the brittle catalyst body is protected against shock loads.

2 Claims, 11 Drawing Figures

FIG. 5
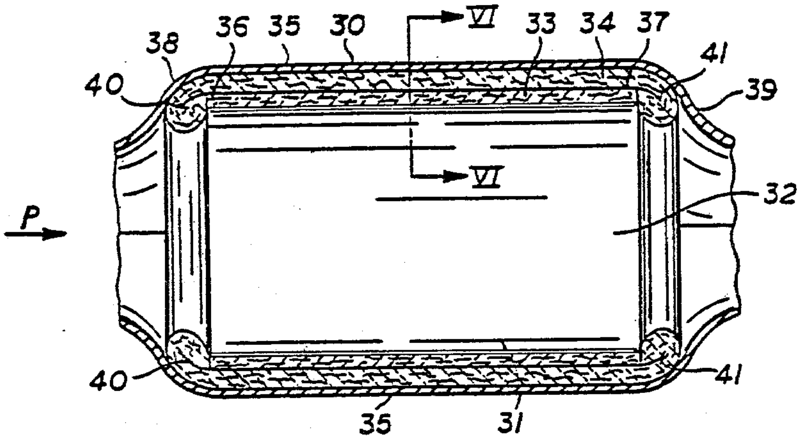
FIG. 6
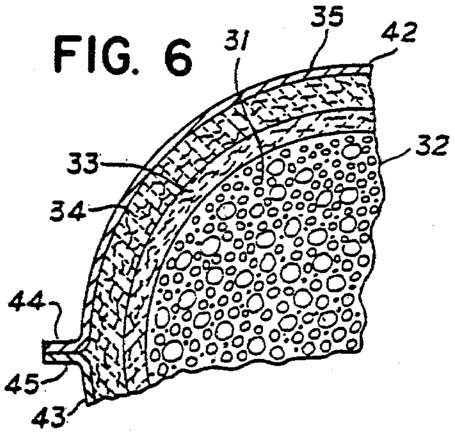
FIG. 7
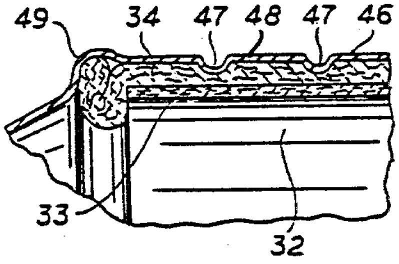
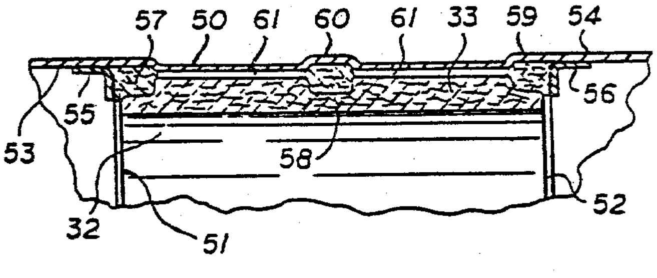
FIG. 8
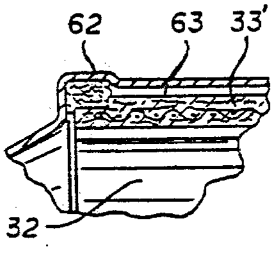
FIG. 9

CATALYZER FOR DETOXIFYING EXHAUST GASES FROM INTERNAL COMBUSTION

This is a division of application Ser. No. 342,540, filed Mar. 19, 1973.

BACKGROUND OF THE INVENTION

The present invention relates to catalyzers for detoxifying exhaust gases from internal combustion engines, especially motor vehicle engines, wherein a catalyst body, preferably a cylindrical catalyst body is supported inside of a housing, preferably a steel housing.

A known catalyzer which is disclosed in German Patent Publication DAS No. 1 476 507, has a catalyst body supported at its facing ends directly by radially extending bends inside the housing without any damping means whereby the bends form chamber end walls. This type of support subjects the catalyst body to shock loads, especially axially directed shock loads whereby the useful life of the catalyst body is substantially reduced, since the catalyst body is made of brittle material such as ceramics. The lack of protection becomes especially pronounced when the catalyzer is installed in a motor vehicle whereby it is subjected to the shocks encountered when the vehicle is driven over uneven road surfaces or the like.

The above mentioned German Patent Publication DAS No. 1 476 507 further discloses to surround the catalyst body with a fiber type of aluminum silicate which acts as a hardening putty thereby closing the pores of the catalyst body. The surrounding layer is supposed to protect the catalyst body, however, this effect is not accomplished due to the lack of damping means in the axial direction and due to the fact that the entire support of the catalyst body is too rigid.

OBJECTS OF THE INVENTION

In view of the foregoing it is the aim of the invention to achieve the following objects, singly or in combination:

to provide a shock absorbing, dampening support for a catalyst body which will protect the catalyst body against shocks effective in the radial as well as in the axial direction;

to provide a support for the catalyst body which will substantially increase the useful life of the catalyst body by dampening shock loads regardless in which direction such loads might be effective;

to provide a support for the catalyst body which will simultaneously assure an effective gas-tight seal of the ring space between the catalyst body proper and the inner surface of the housing wall;

to arrange the supporting means in such a manner that the shock loads are transferred over intervals of substantial length and with greatly diminished amplitudes; and to arrange the supporting elements in such a manner that these elements may cooperate with the housing walls so that these walls will contribute to the dampening of shock loads by the elastic deformation of these walls whereby the amplitudes of the shock loads which might eventually reach the catalyst body are substantially diminished.

SUMMARY OF THE INVENTION

According to the invention there is provided a catalyzer for detoxifying exhaust gases from internal combustion engines wherein elastic supporting means are provided between each facing surface and the catalyzer housing as well as between the catalyst body and the catalyzer housing, for example by means of elastically deformable damping rings or envelopes. Holding means are provided for these elastically deformable means to maintain them in positions between the housing and the circumferential end edges of the catalyst body. Where the damping means comprise rings, these rings are held in position by annular inserts or flanges which provide a seat for the damping rings and which reach partially into the catalyst body in such a manner that between the seats and the catalyzer housing recesses are formed which receive the respective damping rings.

Where the damping means comprise an enveloping layer, the length of the layer is longer than the length of the catalyst body so that the ends of the protective damping layer protrude over the ends of the catalyst body. The protruding ends are formed into bends or bights which are held in position between reduced diameter portions of the housing and the end faces of the catalyst body along the circumferential edges thereof.

The protective damping rings or layers may be made of heat resistant wire in the form of a webbing or having a texture such as steel wool. The damping means may also be made of mineral fibers in the form of braided ropes or the like which may be shaped into prepressed rings or which may be wound around the catalyst body. The arrangement of a supporting flange or a supporting ring inside the housing is especially advantageous where the housing comprises two half shells which are symmetric relative to each other and with respect to a longitudinal axis of the catalyzer.

According to a further embodiment of the invention, there is provided a double housing having an outer wall and an inner wall. First elastically yielding damping ring means are located between the catalyst body and the inner housing wall and second ring means of the same type are located between the outer housing wall and the inner housing wall whereby all of the rings are subjected to stress by forces which are at least radially effective. Thus, stress patterns may occur inside the rings which may be controlled by the shape of the rings as well as by the type of the holding means which keep the rings in position. In addition to the damping rings arranged adjacent to the ends of the catalyst body, it may be desirable to employ an intermediate ring which is preferably located mid-way between the ends of the catalyst body. This type of construction is especially amenable for constructing the double walled housing from two members which are separable along a plane extending perpendicularly relative to the longitudinal axis whereby the ends of the housing members which face each other are arranged to overlap each other in the assembled position. In this instant the intermediate damping ring would preferably be located at the point of overlap. However, the number of intermediate rings should be held small and preferably only one intermediate ring should be used whereby the overlapping housing wall ends should press against the intermediate damping ring.

In order to assure a precise locating or seating of the damping rings, the invention provides a press fit between the rings and the respective holding means of the housing and/or of the catalyst body. For this the housing may be provided with corrugations or recesses. Similarly, the catalyst body or its surrounding protective jacket may be provided with recesses or corrugations for holding the damping rings in position. Where the housing walls have a substantial stiffness, it is preferable to provide the inner housing wall with longitudinal slots whereby the damping effect is improved. The rings may be pressed into their respective holding means when the housing portions are assembled whereby the rings are subjected to respective biasing forces. However, the rings may also be manufactured as packings which are prepressed into the desired shape whereby the packing has a high elasticity which is maintained even at high temperatures. Such elasticity may be improved by embedding into the packing a wire mesh reinforcement. Preferably, the damping rings or damping means are prepressed to provide a gas-tight seal. However, even where such seal is not accomplished, as in the embodiment where the damping rings have a steel wool texture, it has been found that an even more complete contact between the gases and the catalyst body will result.

It is a special advantage of the invention that its teaching permits the construction of the housing in separate shells which, regardless of where they are divided, may be dimensioned in such a manner relative to the size of the catalyst body and relative to the size of the damping rings or layers that these rings or layers will be compressed and thus subjected to the desired biasing forces when the housing members are assembled. By providing the housing with respective recesses or reduced diameter portions, the damping means will also be subjected to axially effective biasing forces.

BRIEF FIGURE DESCRIPTION

In order that the invention may be clearly understood, it will now be described, by way of example, with reference to the accompanying drawings, wherein:

FIG. 5 shows a longitudinal sectional view through another embodiment of a catalyzer according to the invention;

FIG. 6 is a partial sectional view perpendicularly to the flow direction and along the section line VI—VI of FIG. 5;

FIGS. 7, 8 and 9 show partial longitudinal sectional views in the direction of flow through further modifications of the invention;

DETAILED DESCRIPTION OF EXAMPLE EMBODIMENTS

Figure 1:
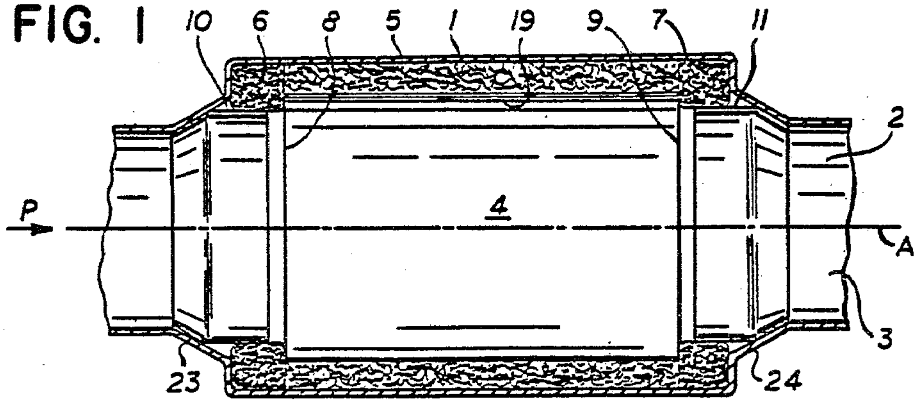
FIG. 1 illustrates a longitudinal, sectional view through a catalyzer having two half shells joined to each other in a plane extending through the longitudinal axis.

According to FIG. 1 the housing 1 comprises an upper half shell 2 and a lower half shell 3. A catalyzer body 4 is arranged inside the housing 1. The catalyzer body 4 is supported relative to the housing in a radial direction by means of an elastic jacket 5 made of wire mesh or netting having a steel wool or webbing type of texture which protects the catalyzer body 4 against shock forces which are radially effective. The wire webbing is secured to the circumference of the catalyzer body 4 by means of a cement layer 19.

In order to dampen shocks which are effective in the direction of the longitudinal axis A the catalyzer body 4 is also supported at its ends by elastically yielding damping rings 6 and 7 which are arranged between the housing 1 and the circumferential edges of the facing surfaces 8 and 9 of the catalyzer body. The damping rings 6 and 7 are preferably clamped in position under a biasing force to limit the axial movements of the catalyzer body to a minimum. These damping rings 6 and 7 are preferably made of a wire mesh or webbing comprising a heat resistant wire, for example, made of a steel alloy including chromium, nickel, aluminum and/or cobalt components.

Figure 2:
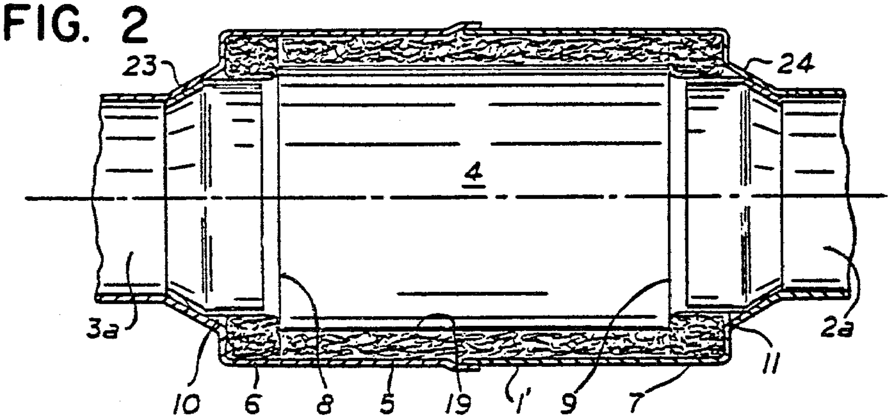
FIG. 2 is a view similar to that of FIG. 1 but showing a housing having two housing members joined to each other in a plane extending perpendicularly to the longitudinal axis.

This arrangement has the further advantage that precise tolerances are not required in manufacturing the damping rings 6 and 7. The supporting rings 10 and 11 prevent a radially inwardly directed displacement of the damping rings 6 and 7. These rings 10 and 11 are attached to reduced diameter portions 23, 24 of the housing 1 as best seen in FIGS. 1 and 2. These rings 10 and 11 may, for example, be spot welded to the housing.

The housing 1 is preferably made of a manganese chromium alloy steel having a ferritic structure or texture and which is heat and scale resistant at temperatures up to 1150° C. The supporting rings 10, 11 are preferably made of a nickel chromium manganese alloy steel having an austenitic structure or texture and a somewhat larger heat expansion than the steel of the housing 1. This feature has the advantage that heat expansions do not jeopardize the attachment of the supporting rings to the housing because the expansion merely further compresses the damping rings 6, 7. In selecting the alloy of the wire for the jacket 5 and for the damping rings 6 and 7 it is to be kept in mind that these elements must not lose their elasticity even at high temperatures to any appreciable extent. A sealing of the jacket 5 which fills the annular gap between the inner surface of the wall housing and the catalyzer body proper by the rings 6 and 7 is not necessary because the exhaust gas quantities flowing into this ring zone surrounding the catalyzer body 4 are negligibly small. In fact, it has been found that the gas permeable structure of the damping rings 6 and 7 due to their being made of a wire mesh or webbing has the advantage, as compared to a sealing structure, that an even more uniform contact between the exhaust gases and the catalyzer body 4 is accomplished also in the outer zones of the catalyzer body.

FIG. 2 shows a catalyzer body corresponding substantially to that of FIG. 1 as far as its longitudinal section is concerned. The modification resides in the fact that the housing 1' of FIG. 2 comprises two tubular housing members which fit into each other with some overlap as seen in FIG. 2. These members divide the housing 1' in a plane extending substantially perpendicularly to the longitudinal axis and approximately through the center of the housing to form two half shells **2*a* and 3*a*** whereby the end of one half shell fits into the respective end of the opposite half shell with said overlaps around the circumference where the two shells may be welded to each other.

Figure 3:
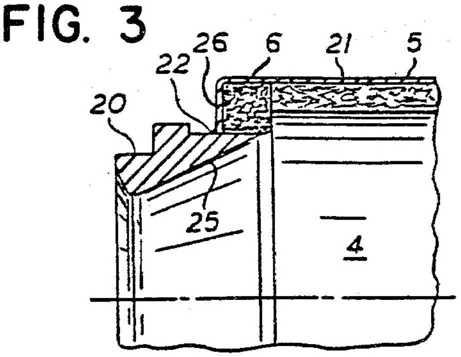
FIGS. 3 and 4 illustrate further modifications in partial longitudinal sectional views similar to that of FIGS. 1 and 2.

FIG. 3 shows a partial longitudinal section through another embodiment of a catalyzer body having a housing 21 which is provided at its ends with facing walls 26. A flange 20 suitable for connection to a tubular bushing or to an engine housing is connected to each wall 26 as by a weld 22. The portion 25 of the flange 20 which reaches into the housing 21 performs the same function as the supporting rings 10, 11 of FIGS. 1 and 2.

Figure 4:
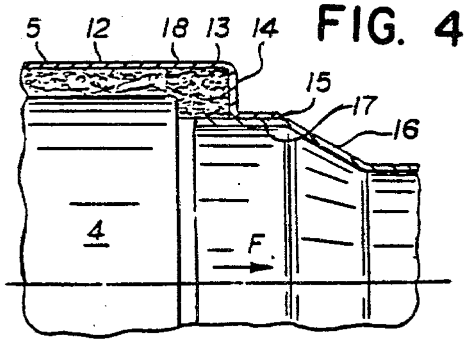

In the embodiment according to FIG. 4 the housing 12 has end portions 14 facing radially inwardly and then again axially outwardly at a diameter substantially corresponding to the inner diameter of an elastically yielding support ring 13. A connecting pipe member 16 reaches into the housing 12 to form with its inner end 17 an annular support for the ring 13. The housing portion 14 and the connecting pipe member 16 are connected to each other, for example by a weld 15. Due to the compression of the damping ring 13, the latter also surrounds the catalyzer body 4 to some extent at its outer circumference adjacent to the end 18 thereby overlapping the facing edges of the body 4 with the shape of the ring 13. Such shape of the damping ring 13 may, however, also be provided prior to its installation, for example by respectively pressing the ring into the desired shape.

Within the framework of the invention further different cross sectional shapes of the catalyzer body and thus of the damping rings and of the housing may be contemplated. However, the preferred cross sectional shape is the illustrated circular shape. An advantageous somewhat flat embodiment comprises an eliptical cross section. Further, the damping rings may comprise a plurality of narrower rings in order to adapt the shape of the rings to the different structural shapes and dimensions of the catalyzer body and the housing.

Incidentally, the engine exhaust gases flow through the housing 1 or 30 in the direction of the arrow P as is also shown in FIGS. 1 and 5. These gases comprise air polluting components such as hydrocarbons or carbon monoxides. If desired, air might have been admixed to these gases which flow at high speeds through the catalyzer housing. The gas will seek the flow channels 31 (FIG. 6) through the catalyzer body 32 which offer the largest surface. The catalyzer body 32 is rather shock sensitive because it is made of a porous brittle ceramic material. In order to support the catalyzer body in a shock proof manner, it is surrounded by a protective jacket 33 made of a material to be described in more detail below. The protective jacket 33 stiffens the catalyzer body 32 and protects it against localized pressure effects. The protective jacket 33 is enveloped around its circumference by a soft mineral fiber layer 34 which is compressed between the housing wall 35 and the protective jacket 33. The soft fiber layer 34 extends with its ends 40, 41 beyond the facing ends 36, 37 of the jacket 33. The protruding ends 40, 41 of the layer 34 are folded radially outwardly towards the inner surface of the housing thereby forming bends or full bights which are held between the ends 36, 37 of the jacket 33 and the housing wall portions 38, 39 of reduced diameter so that the catalyzer body 32 is isolated against shocks resulting in forces which are effective approximately in the direction of the arrow P. This additional isolation against axially effective forces is accomplished because the end bends or bights 40, 41 of the fiber layer jacket 33 dampen these shock forces. These bends or bights rest on the one hand against the protective jacket 33 of the catalyzer body 32 and on the other hand these bends or bights rest against the adjacent reduced diameter portions 38, 39 of the housing 30, the reduced diameter reducing the spacing between the catalyst body ends and the housing wall at the location of said reduced diameter to less than twice the thickness of the layer 34 to thereby further compress the bends or bights.

FIG. 6 illustrates that the housing 30 comprises two housing members including an upper half shell 42 and a lower half shell 43. These half shells comprise longitudinal flanges 44 and 45 along which the shells are tightly connected to each other, for example, by means of point welds. The outer circumference of the catalyzer body 32 with the protective jacket 33 and the fiber layer 34 is so dimensioned relative to the inner circumference of the housing shells 42 and 43 that the fiber layer 34 is compressed and thus compacted when the two housing shells 42, 43 are connected to each other.

FIG. 7 illustrates a partial section of a modified embodiment similar to that of FIG. 5. In this modified embodiment the housing 46 comprises circumferentially extending inwardly directed grooves or corrugations 47 in the housing wall 48. The fiber layer 34 is bent at both ends first radially inwardly and then outwardly again. Further, the fiber layer 34 is tightly pressed against the housing wall 48 so that the fiber material is compressed between the ends of the catalyzer body and the adjacent housing wall 49 of reduced diameter. The compression forces in this area are effective substantially in the direction of flow as indicated by the arrow P. The reduced diameter portion 49 in the housing wall 48 forms an integral part of the housing 46 as shown in FIG. 7.

The embodiment of FIG. 8 illustrates another modification in which the housing wall 50 does not comprise an area of reduced diameter at the facing ends 51 and 52 of the catalyzer body 32. Rather, the wall portions 53 and 54 extend the housing in a straight manner. The catalyzer body 32 and thus the protective jacket 33 are restrained against axial displacements by means of flanges 55 and 56 which are secured to the housing wall 50 in a gas tight manner, for example by welding. In this embodiment the fiber layer is provided in strips 57, 58 and 59 which extend into respective recesses in the protective jacket 33 and in the housing wall 50. In the housing wall these recesses appear as outwardly extending corrugations 60. The recesses secure the strips 57, 58, 59 against axial displacement. The two outer strips 57 and 59 have a ring shape in order to contact the catalyzer body 32 all around its circumferential edges of the faces 51, 52 whereby respective portions of the rings contact the adjacent facing surface of the catalyzer body to seal the ring gap 61 in a gas tight manner.

Preferably the catalyzer body has a cylindrical shape. The housing 30 may then be formed from two cylindrical half shells whereby the corrugations 47 and 60 extend around the housing shells in a circular fashion. Thus, between the strips 57 and 58 or 58 and 59 said ring gap 61 is formed which acts as a heat insulator.

FIG. 9 shows a catalyst body 32 which is supported relative to the housing merely by two ring shaped seaing ropes 62 extending around the end faces or edges of the cylindrical catalyst body. A reinforcing metal member 63 is embedded in the protective jacket 33'. For example, the reinforcing member 63 may be a wire mesh or the like.

Figure 10:
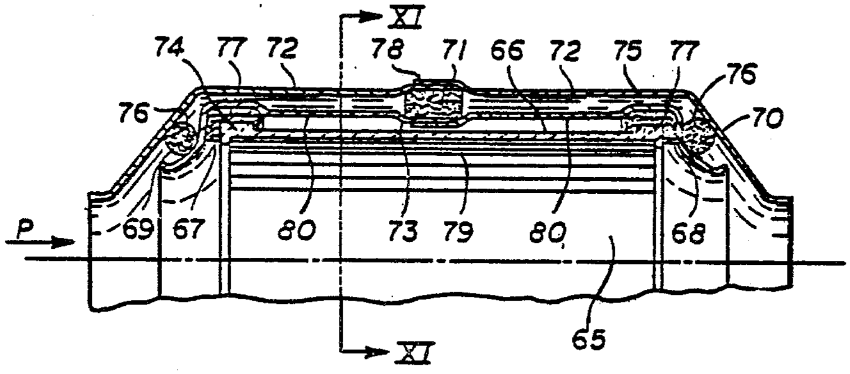
FIG. 10 is a longitudinal sectional view through a catalyzer according to the invention omitting the lower half which is symmetric to the shown upper half relative to the longitudinal axis.
Figure 11:
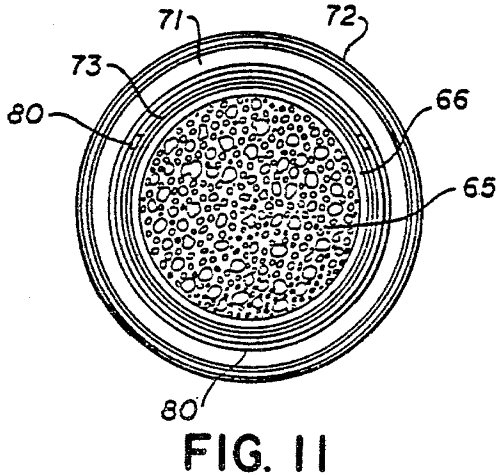
FIG. 11 is a section along the line XI—XI in FIG. 1.

The catalyst body 65 (FIG. 10) is made of a brittle but fire-proof ceramic material, for example, a magnesium silicate or aluminum oxide or the like. Thus, this catalyst body 65 is sensitive to impact loads. Such sensitivity is even increased due to the fact that the catalyst body 65 comprises a plurality of small flow channels so that the body has a skeletal type of structure. Depending upon whether the body is intended to work as an oxidation or as a reduction catalyzer the structure comprises a coating of a material suitable for the desired catalytic effect. For example, an oxidation catalyzer would comprise a coating of fire-proof metal oxides or a metal coating such as platinum, rhodium or the like.

To protect the catalyst body and to enable its safe handling without breakage, the catalyst body 65 is enveloped by a protective jacket 66, for example, made of a heat resistant cement or a putty made of so called "Fiberfrax" material whereas the fibrous adhesive comprises fuzzy, chemically stable and non-combustible mineral fibers essentially made of aluminum oxide fibers and silicon oxide fibers with a binder substance.

The protective jacket 66 is surrounded about its entire circumference by rings 67, 68. The end rings 69, 70 as well as the intermediate ring 71 are arranged between an outer housing wall 72 and an inner housing wall 73 of the housing. The rings 67 and 68 are held, preferably by a form fit, between the inner housing wall 73 and the end ledges 74, 75 of the protective jacket 66. All of these rings are made of elastically yielding heat resistant fibrous material, for example, the above mentioned "Fiberfrax" material. These rings may also be made of similarly composed fibers known under the trade name "Cerafelt." The different rings may be surrounded by a wire netting 76 or they may be reinforced by a wire web 77 preferably of the type known under the trade name "Kanthal" comprising alloying components or chromium, aluminum and/or cobalt.

The housing walls themselves may be made of a nickel chromium alloy steel having an austenitic texture which is heat and scale resistant up to 1150° C.

For simplifying the mounting the housing walls 72 and 73 each comprise two members whereby the inner ends of these members overlap each other in the area of the intermediate ring 71. These overlapping ends 78 and 79 may be connected to each other by point welds. However, if these ends of the housing members are not connected to each other an even improved damping effect is achieved. The inner housing wall may be provided with longitudinally extending slots 80.

Oscillations of the housing members which may, for example occur in the area of the intermediate rings are transmitted with a diminishing amplitude in the outer wall 72 and from there to the end rings 69 and 70 into the inner wall 73 to the rings 67 and 68. Thus, if shock loads occur, damping intervals are established having a length of at least one half the length of the catalyst body so that the remaining oscillation enters through the rings 67, 68 into the protective jacket 66 in the area of the end ribs 74, 75 which engage the rings 67 and 68 in a form-fit manner as mentioned.

Where the damping means comprise an elastically yielding gas tight layer of mineral fibers it is preferred according to the invention to avoid binder components or to minimize the quantity of binder components so that the layer will not harden but will retain its soft down type texture. This type of support for the catalyst body is also rather suitable for engines having a low engine frequency, that is, a small number of cylinders. The arrangement of the present damping support means provides not only a form fit, but also a friction fit between the catalyst body and the housing. This has the advantage that the assembly of the elements into the finished catalyzer is greatly facilitated.

Where damping strips are used instead of a complete damping layer, for example in connection with motor vehicles which are not exposed to extreme shock conditions, these strips may be provided in the form of sealing ropes, braided sealing rings, or the like which are prepressed or which are enveloped by a fine meshed wire netting preferably under tension. Such strips may be wound around the catalyst body in a helical shape or separate parallel rings may be employed. In connection with the protective jacket for the catalyst body proper it should be mentioned that the jacket must function as a cover or envelope which is rigidly secured to the catalyst body. For this purpose a stiff wire mesh or a heat resistant cement layer are suitable. Further, a wire mesh material may be embedded inside a cement layer. However, the protective jacket may be omitted altogether where the intended use will not subject the catalyzer to extreme shock conditions.

The material for the catalyzer housing is preferably a steel which is known under the trade name "Thermax." This is a nickel chromium steel alloy having a austenitic texture which is heat and scale resistant at temperatures up to 1150° C.

A suitable material for the elastically yielding damping layer is a material known under the term "Fiberfrax" as mentioned above, which comprises mineral fibers of a down type chemically stable texture including substantially aluminum oxide and silicon dioxide. A similar material known under the trade name "Cera-Pak" may also be used. The protective jacket could be made of a heat resistant cement or a putty also comprising the materials of the above mentioned "Fiberfrax." Materials known as "Cerafelt" and "Blakite" are also suitable. The wire mesh for the protective jacket could be made of a wire known under the trade name "Kanthal" which is an alloy of chromium, aluminum and/or cobalt.

The catalyst body itself may be made of different materials depending upon the intended use as an oxidation or as a reduction catalyzer. The catalyst body which provides a carrier for the catalyst may for example be a fire-proof ceramic material such as magnesium silicate, aluminum oxide, zirconium or the like.

This carrier body provides a coherent skeletal structure which is porous and includes flow channels for the gases to be detoxified. This carrier structure is provided with the catalyst for example in the form of a thin layer deposited from a vapor phase. An oxidation catalyzer may thus, for example, comprise fire-proof metal oxides or metals such as platinum, rhodium, paladium or iridium.

Although the invention has been described with reference to specific example embodiments, it is to be understood, that it is intended to cover all modifications and equivalents within the scope of the appended claims.

What is claimed is:

1. In a catalyzer for detoxifying exhaust gases from internal combustion engines, wherein a monolithic catalyst body having an outer surface and facing ends is supported in a housing having an inner surface, by support means arranged between said inner surface of said housing and said outer surface of said monolithic catalyst body, the improvement wherein said support means comprises a layer of elastically yielding means, said layer extending at least partially between each facing end of said monolithic catalyst body and said housing, whereby the monolithic catalyst body is elastically restrained in said housing against movement in all three dimensions of space, said layer of elastically yielding means extending radially inwardly across said facing ends and then folding radially outwardly towards said inner surface, to form bends which bends are compressed between said facing ends and said housing, the bends in said layer forming elastically deformable damping means to restrain said catalyst body and form a substantially gas tight barrier, thereby substantially preventing the flow of gas into the space between the catalyst body and the inner surface of the housing.

2. A catalyzer according to claim 1 wherein said inner surface of the housing wall located longitudinally beyond and adjacent the ends of the catalyzer body is of reduced diameter relative to the diameter of the housing wall between said catalyst body ends, said reduction in diameter reducing the spacing between the catalyst body ends and the housing wall at said location of reduced diameter to less than twice the thickness of a single layer of said elastically yielding means, thereby further compressing the bends between said facing ends and said inner surface of reduced diameter.

* * * * *